US006711163B1

(12) United States Patent
Reid et al.

(10) Patent No.: US 6,711,163 B1
(45) Date of Patent: Mar. 23, 2004

(54) DATA COMMUNICATION SYSTEM WITH DISTRIBUTED MULTICASTING

(75) Inventors: Steven William Reid, Park City, UT (US); L. Michele Wright Goodwin, Westlake Village, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/313,900

(22) Filed: May 18, 1999

Related U.S. Application Data
(60) Provisional application No. 60/123,142, filed on Mar. 5, 1999.

(51) Int. Cl.[7] .............................................. H04L 12/56
(52) U.S. Cl. ........................ 370/390; 370/401; 370/432
(58) Field of Search ................................ 370/390, 401, 370/432, 381

(56) References Cited

U.S. PATENT DOCUMENTS

| | | | | |
|---|---|---|---|---|
| 4,706,080 | A | | 11/1987 | Sincoskie ............... 340/825.02 |
| 4,740,954 | A | | 4/1988 | Cotton et al. ................. 370/60 |
| 5,331,637 | A | | 7/1994 | Francis et al. ................ 370/54 |
| 5,522,042 | A | | 5/1996 | Fee et al. .............. 395/200.01 |
| 5,608,726 | A | | 3/1997 | Virgile |
| 5,740,175 | A | * | 4/1998 | Wakeman et al. .......... 370/422 |
| 5,790,545 | A | * | 8/1998 | Holt et al. ................... 370/398 |
| 5,812,771 | A | | 9/1998 | Fee et al. .............. 395/200.31 |
| 5,898,686 | A | * | 4/1999 | Virgile ........................ 370/381 |
| 6,085,238 | A | | 7/2000 | Yuasa et al. ................ 709/223 |
| 6,091,725 | A | * | 7/2000 | Cheriton et al. ............ 370/392 |
| 6,101,187 | A | * | 8/2000 | Cukier et al. ............... 370/396 |
| 6,216,167 | B1 | * | 4/2001 | Momirov ..................... 709/238 |
| 6,331,983 | B1 | * | 12/2001 | Haggerty et al. ........... 370/400 |
| 6,370,142 | B1 | * | 4/2002 | Pitcher et al. .............. 370/390 |

OTHER PUBLICATIONS

"IP Multicast Streamlines Delivery of Multicast Applications," Cisco Systems Users Magazine, pp. 7–9, vol. 7, No. 1, First Quarter 1995.

Cheriton, David R., et al., "Host Groups: A Multicast Extension for Datagram Internetworks," In Proceedings of the Ninth Data Communications Symposium, ACM/IEEE, pp. 172–179, Sep. 1985.

Deering, Stephen E. et al., "Host Groups: A Multicast Extension to the Internet Protocol," IETF Network Working Group RFC:966, http://ietf.org/rfc/rfc 0966.txt, Dec. 1985.

Kobayashi, Tetsuo, Let's Discern Necessary Additional Functions for Several Year's Use, How to Read SW Hub Catalog—Understandable for Beginners, pp. 202–211, No. 71, Nikkei BP Co., Ltd., Feb. 15, 1999. (with translation).

Kikuchi, Takahiro, Giga Bits Router, Real Image of a New Architecture Supporting Fast Developing Internet, Nikkei Communication, pp. 104–113, No. 251, Nikkei BP Company, Aug. 4, 1997. (with translation).

Maruyama, Makoto et al., Parallel Distributed High–Speed Communication Switch COREswitch, Technical Report of the Institute of Electronics, Information and Communication Engineers, pp. 41–48, vol. 98, No. 572, Institute of Electronics, Information and Communication Engineers Corporation, Jan. 29, 1999. (with translation).

* cited by examiner

*Primary Examiner*—Kenneth Vanderpuye
(74) *Attorney, Agent, or Firm*—David A. Cordeiro; Scot Reader

(57) ABSTRACT

A bridge provides distributed multicast forwarding with sub-interface granularity. Forwarding decisions on multicast data packets transmitted on the bridge backplane are made by network interfaces by referencing local multicast databases. Each network interface forwards multicast data packets only on local ports which belong to the multicast group identified in the packet. A management interface transmits forwarding updates to the network interfaces. A particular network interface is made responsible for forwarding multicast packets to management interface for learning.

12 Claims, 6 Drawing Sheets

DATA COMMUNICATION SYSTEM WITH DISTRIBUTED MULTICASTING

This application claims the benefit of Provisional Application Ser. No. 60/123,142 filed Mar. 5, 1999.

BACKGROUND OF THE INVENTION

The present invention relates to multicasting in data communication networking and, more particularly, to multicasting in a local area network (LAN) bridge.

Traditionally, a LAN was a single broadcast domain shared among network devices needing to communicate with one another. As more and more network devices were added to such LANs, competition for the shared bandwidth intensified and communication began to slow. To overcome this problem, devices called bridges were interposed to segment the network devices into multiple broadcast domains. Traditional LANs then began to be called "LAN segments" within a larger network topology which included multiple LAN segments, bridges, and often times a router for linking the network devices on the LAN segments with a backbone network.

Bridges are intelligent devices which transmit packets from one broadcast domain to another over a shared backplane. Rather than transmitting packets indiscriminately, however, network interfaces on a bridge apply Media Access Control (MAC) bridging rules. Each network interface learns the MAC addresses of the network devices connected to the bridge through itself from the source MAC addresses encoded packets received from such devices. When a subsequent packet is received on the backplane, the network interfaces are then able to individually check the packet's destination MAC address and determine if such address is among the list of previously learned MAC addresses. If the address is found in the list, the interface forwards the packet. If it is not found in the list, the interface filters the packet, unless no other interface on the bridge has claimed the packet. Through such "look up" operations conducted at each network interface, bridges advantageously reserve backplane and media bandwidth for packets requiring transmission in order to reach their intended destination.

Recent vintage bridges often implement bridging rules in custom integrated circuits. Such bridges are commonly referred to as "switches", though their core function is not very different from traditional bridges. But by reducing basic bridging "look up" operations to custom logic, switches are able to pass traffic at or near wire speed. Switches thus have reduced packet loss and latency as compared with more processor-dependent bridges.

While bridged networks have advantages in speed and simplicity of implementation, they have experienced problems handling multicast traffic. Multicast packets are not destined for any one network device, so the destination MAC addresses encoded in such packets do not correspond to a "source learned" address on any one network interface. Absent additional rules, all network interfaces within the same subnetwork will therefore capture and indiscriminately retransmit multicast packets. Incident to such packet "flooding", however, is consumption of bandwidth on media where no destination network device resides. In a multi-bridge environment, a spanning tree algorithm must also be run to prevent loops, imposing an additional tax on performance.

One alternative to flooding multicast packets is conventional multicast routing. Multicast routing restricts multicast traffic to particular subnetworks and therefore reduces flooding. Accordingly, while speed and simplicity of implementation generally points toward bridging, multicasting requirements suggest a continued place in a bridged network for routing. Out of this dichotomy were born bridges supporting both bridging and multicast routing. In a typical arrangement, a multicast router is configured on a processing entity logically interposed on a bridge backplane between network interfaces. This "internal" router learns the multicast groups to which each of the bridge's network interfaces belongs. Network interfaces transmit multicast data packets to the router using a well-known destination MAC address of the router interface. The router consults a multicast routing database and resolves the packet's multicast destination network address (i.e., multicast group address) to a set of network interfaces on the bridge supporting such address. The router then retransmits the packet on the backplane. The network interfaces then apply conventional MAC bridging rules to the transmitted packet. Through such "look up" operations performed at the router and network interfaces, a bridge/router advantageously reserves media bandwidth for only those multicast packets destined for subnetworks to which network interfaces belong.

The bandwidth savings realized by implementing multicast routing on a bridge has, however, come at a price. First, multicast routing has required an extra step in the forwarding process. Where a bridged packet is reviewed only at the network interfaces, a packet routed by a multicast router is reviewed at the network interfaces and a router interface. The added routing step is not only time-consuming but requires a second transmission across the backplane. Moreover, some LAN segment bandwidth is still wasted because multicast routers discriminate only at the interface level. Packets therefore continue to be flooded out ports associated with an interface which has a host belonging to the multicast group even where no network device belonging to that multicast group is reachable through the port. Accordingly, there is a need for a multicasting capability for a bridge which has superior speed and bandwidth conservation characteristics.

SUMMARY OF THE INVENTION

In one aspect, the present invention improves multicast communication in a bridge through the expedient of distributed multicast forwarding with sub-interface granularity. A plurality of network interfaces share a backplane of a bridge. The network interfaces each have a plurality of ports and retain a local multicast database which associates multicast groups active on the interface with local ports active in such groups. Forwarding decisions on multicast data packets transmitted on the backplane are made by network interfaces by referencing their local multicast databases. Each network interface forwards multicast data packets only on the local ports which belong to the multicast group identified in the packet.

In another aspect, configuration of the local multicast databases is assisted by a management interface which shares the backplane with the network interfaces. The management interface retains a global multicast database which associates multicast groups active on the bridge with ports active in such groups, The management interface updates the active port lists for multicast groups in the global multicast database with group/port association changes learned from multicast control packets transmitted on the backplane. The management interface transmits forwarding updates to the network interfaces having ports belonging to such groups.

In another aspect, a particular network interface is made responsible for each multicast group for forwarding multicast control packets and unknown multicast data packets to management interface for learning in order to reduce oversubscription of backplane bandwidth.

These and other objects of the invention can be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
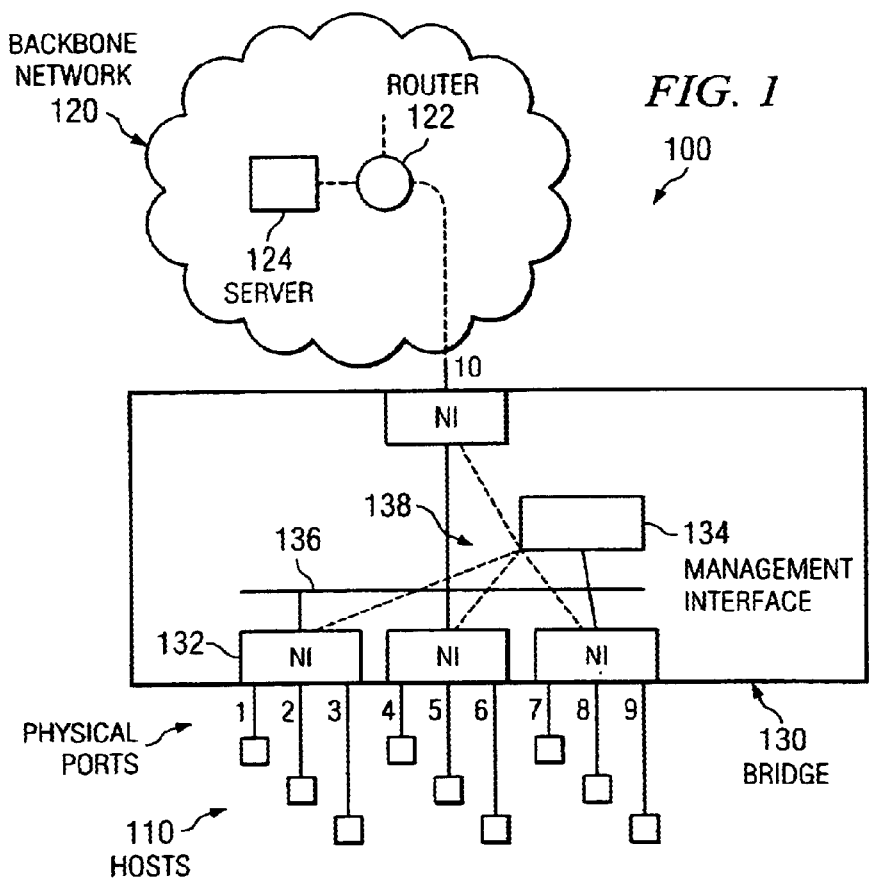
FIG. 1 is a block diagram illustrating a physical network in which the present invention is operative.

In FIG. 1, a physical data communication network 100 in which the present invention is operative is shown. Network 100 includes hosts 110 on distinct broadcast domains interconnected with other hosts and with resources in backbone network 120, including router 122 and server 124, via bridge 130. Bridge may implement bridging rules and distributed multicast forwarding in custom integrated circuits, processors, or a combination. Hosts 110 are addressable network devices, such as PCs, workstations and servers. Bridge 130 has a plurality of network interfaces 132 and a management interface 134 interconnected over backplane 136. Backplane 136 is illustrated as a common bus, but may take other forms, such as a matrix of root-to-leaf connections or point-to-point connections between network interfaces 132. Backplane 136 may operate at half or full duplex. Management interface 134 and network interfaces 132 are linked by control lines 138. Hosts 110 and backbone network 120 are interconnected to network interfaces 132 on physical ports 1–9. Network interfaces 132 may support various CSMA/CD or token-passing protocols operative on their associated broadcast domains, such as Ethernet, Fast Ethernet, Gigabit Ethernet, Token Ring and Fiber Distributed Data Interface (FDDI). Naturally, if backbone network 120 is a connection-oriented network, such as an Asynchronous Transfer Mode (ATM) network, the network interface associated with network 120 will support such connection-oriented protocol. Where bridge 130 is operating in a multi-protocol environment, packets are encapsulated using a format commonly understood by interfaces 132, 134 before transmission on backplane 136.

Figure 2:
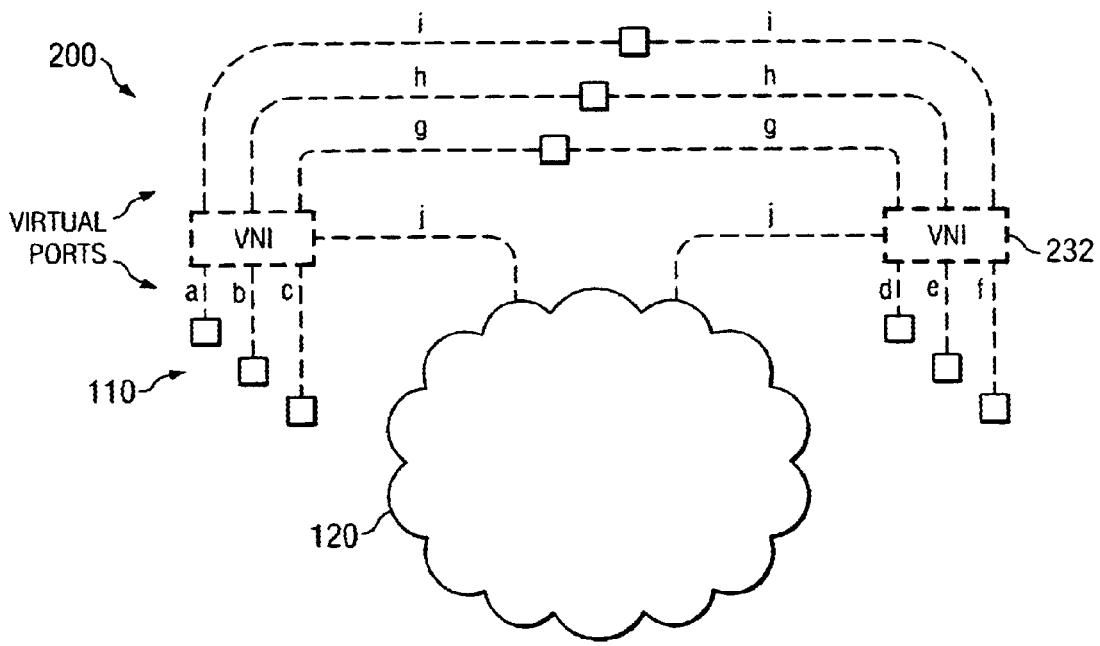
FIG. 2 is a block diagram illustrating a logical view of the network according to FIG. 1.

FIG. 2 presents a logical view 200 of physical network 100. Multicast communication between and among hosts 110, and between hosts 110 and backbone network 120, is conducted through virtual network interfaces 232 and virtual ports a–j. Each of the physical network interfaces 132 may be associated with one or more of virtual network interfaces 232, and each virtual network interface may be associated with one or more of virtual ports a–j. Associations between physical network interfaces 132 and virtual network interfaces 232, and between physical ports and virtual ports, may be made either statically or dynamically. The basic multicast forwarding operation on bridge 130 is accomplished by resolving on network interfaces 132 identifiers in multicast data packets, including multicast group addresses, to virtual ports or, if not available, virtual interfaces, and forwarding such packets on the resolved virtual ports or virtual interfaces. The resolved multicast group addresses are encoded in the destination network address field of multicast data packets.

Figure 3:
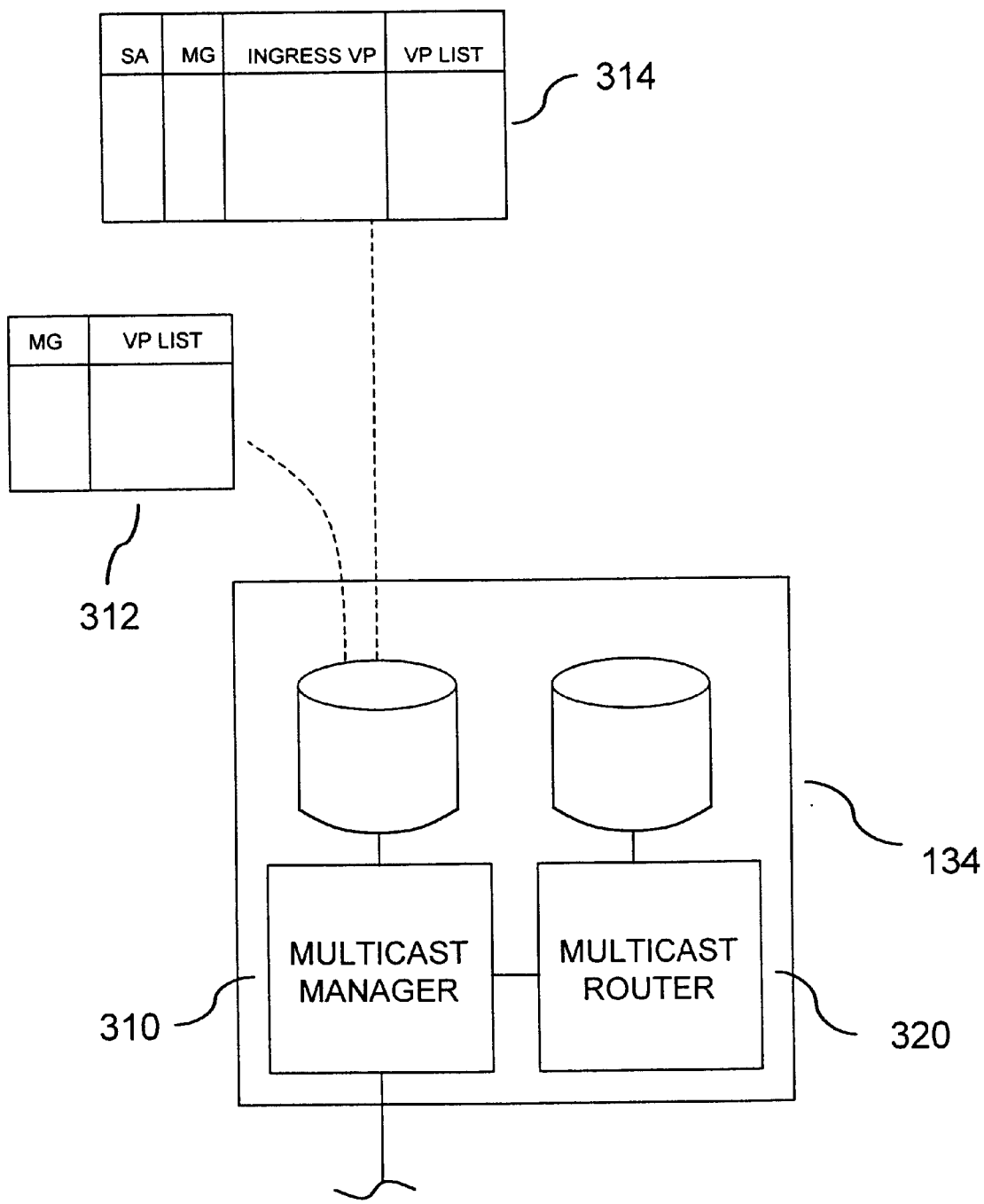
FIG. 3 is block diagram illustrating the management interface according to FIG. 1 in greater detail.

Referring to FIG. 3, management interface 134 is shown in greater detail. Management interface 134 has multicast manager 310, group/port database 312 and global multicast database 314 for facilitating the distributed multicast forwarding operation. Multicast manager 310 learns associations from three different types of multicast packets transmitted on backplane 136 and records them in databases 312 and 314. First, multicast manager 310 learns multicast group to virtual port associations from host membership packets originated by hosts 110 and records them in group/port database 312. Second, multicast manager 310 learns multicast group to virtual port associations from route control packets transmitted by neighboring routers, such as router 122, to multicast router 320 and records them in group/port database 312. Third, multicast manager 310 learns associations between source network addresses, multicast group addresses and ingress ports from unknown multicast data packets originated by network devices, such as hosts 110, and records the associations as "master" entries in global database 314. The ingress port is the virtual port on which the multicast data packet arrived at bridge 130. Multicast manager 310 consults the group/port associations recorded in group/port database 312 and updates the virtual port element of "master" entries in global database 314 for the multicast group through an internal (to management interface 134) data transfer operation. Contents from "master" entries are transferred from management interface 134 to network interfaces 132 belonging to the multicast group "out of band" on control lines 138 through an external (to management interface 134) data transfer operation. Network interfaces 132 employ the transferred contents of "master" entries to construct and update "'shadow" entries allowing network interfaces 132 to make efficient forwarding decisions on multicast data packets received from backplane 136 from other network interfaces. Particularly, "shadow" entries are consulted by network interfaces to make forwarding decisions on multicast data packets without central processor intervention on a packet-by-packet basis. Moreover, because the contents of "master" entries received from global database 314 include associations between multicast groups and virtual ports, the forwarding decisions made by network interfaces 132 by consulting the "shadow" entries advantageously result in multicast data packets being forwarded only on the set of virtual ports which belong to the target multicast group.

In a preferred embodiment, group/port database 312 is arranged such that each multicast group in database 312 has its own group table which includes a pointer to the first entry in a linked list of entries identifying virtual ports active in the group. A timer value is stored in association with each virtual port in the list such that stale ports age-out of the list.

Multicast router 320 learns multicast group to virtual network interface associations from host membership packets and route control packets.

The first packet type relied on by multicast manager 310 to configure bridge 130 for distributed multicast forwarding is the host membership packet. Host membership packets have a type identifier, which identifies such packets as host membership packets, and have a multicast group address. By way of example, host membership packets may include Internet Group Management Protocol (IGMP) Version Two (v.2) Membership Reports and Leave Group packets. For each multicast group active on bridge 130, a single network interface is delegated responsibility for forwarding to management interface 134 host membership packets for a the group to avoid duplicate processing of host membership packets by multicast manager 310. Delegation is made such that the responsible network interface is always associated with at least one port belonging to the multicast group for which the interface is responsible.

The second packet type relied on by multicast manager 310 to configure bridge 130 for distributed multicast forwarding is the route control packet. Route control packets are originated by neighboring routers, such as router 122. Route control packets have a type identifier, which identifies such packets as route control packets, and have a multicast group address. By way of example, route control packets may be Internet Group Management Protocol (IGMP) Version Two (v.2) Distance Vector Multicast Routing Protocol (DVMRP) packets.

The third packet type relied upon by multicast manager 310 to configure bridge 130 for distributed multicast forwarding is the unknown multicast data packet. Unknown multicast data packets are originated by network devices, such as hosts 110. Unknown multicast data packets are characterized by a combination of packet identifiers, including source network address, multicast group address and ingress port, for which there is no matching entry in the local multicast database of any of network interfaces 132. For each multicast group active on bridge 130, a single network interface is delegated responsibility for forwarding unknown multicast data packets to management interface 134 for the group to avoid duplicate processing of unknown multicast data packets by multicast manager 310. Delegation is made such that the responsible network interface is always associated with at least one port belonging to the multicast group for which the interface is responsible. Preferably, the same network interface responsible for forwarding host membership packets for a particular multicast group is responsible for forwarding unknown multicast data packets for that group.

Figure 4:
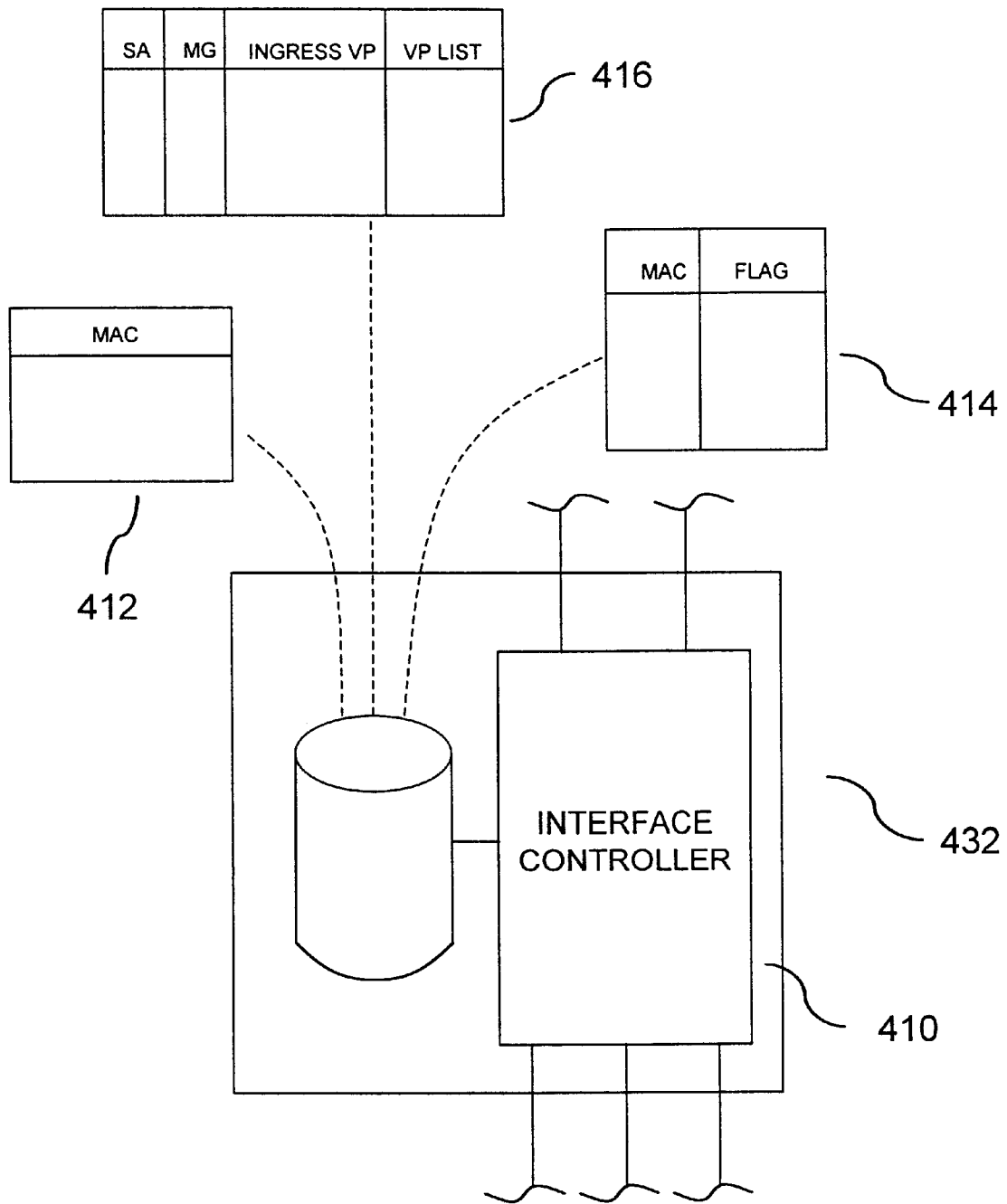
FIG. 4 is a block diagram illustrating a network interface according to FIG. 1.

Referring now to FIG. 4, a representative network interface 432 is shown. Network interface 432 is representative of network interfaces 132 for purposes described herein. Network interface 432 has interface controller 410, claiming database 412, responsibility database 414 and local multicast database 416 for accomplishing distributed multicast forwarding. Controller 410 is responsible for maintaining databases 412, 414, 416 and for packet forwarding. Controller 410 learns multicast forwarding information from management interface 134 through two different types of messages transmitted on control lines 138. The first type of message controller 410 receives is a "forwarding update" message including contents of a "master" entry from global multicast database 314. Each "forwarding update" message includes a source network address, multicast group address, ingress port and virtual port, and may include other control information such as virtual local area network (VLAN) identifiers. For each "forwarding update" message received, controller 410 constructs or updates up to three entries. First, controller constructs or updates in local multicast database 416 a "shadow" entry which includes the source network address, multicast group address, ingress port and virtual port corresponding to the transferred contents of "master" entry. Second, controller 410 records in claiming database 412 the MAC address corresponding to the multicast group address identified in the transferred contents of "master" entry, if such destination MAC address has not already been recorded. In this regard, MAC addresses are numerically related to multicast group addresses in a preferred embodiment such that multicast group addresses for a distinct set of multicast groups are resolvable to a MAC: address: Third, controller 410 records in responsibility database 414 an entry callable by the MAC address corresponding to the multicast group address identified in the transferred contents of "master" entry, if such entry has not already been created. The second type of message controller 410 receives is a "responsibility" message designating interface 432 as the responsible interface for a multicast group for which there is at least one "shadow" entry in local multicast database 416. Controller 410 sets a flag in responsibility database 414 in a reserved field in the entry callable by the MAC address corresponding to the multicast group for which interface 432 is delegated responsibility. In a preferred embodiment, claiming database 412 is implemented in a content addressable memory (CAM) and responsibility database 414 and local multicast database 416 are implemented in random access memory (RAM). Accordingly, the CAM index at which a MAC address resides in claiming database 412 may be advantageously recorded in responsibility database 414 in lieu of the complete MAC address.

Figure 5:
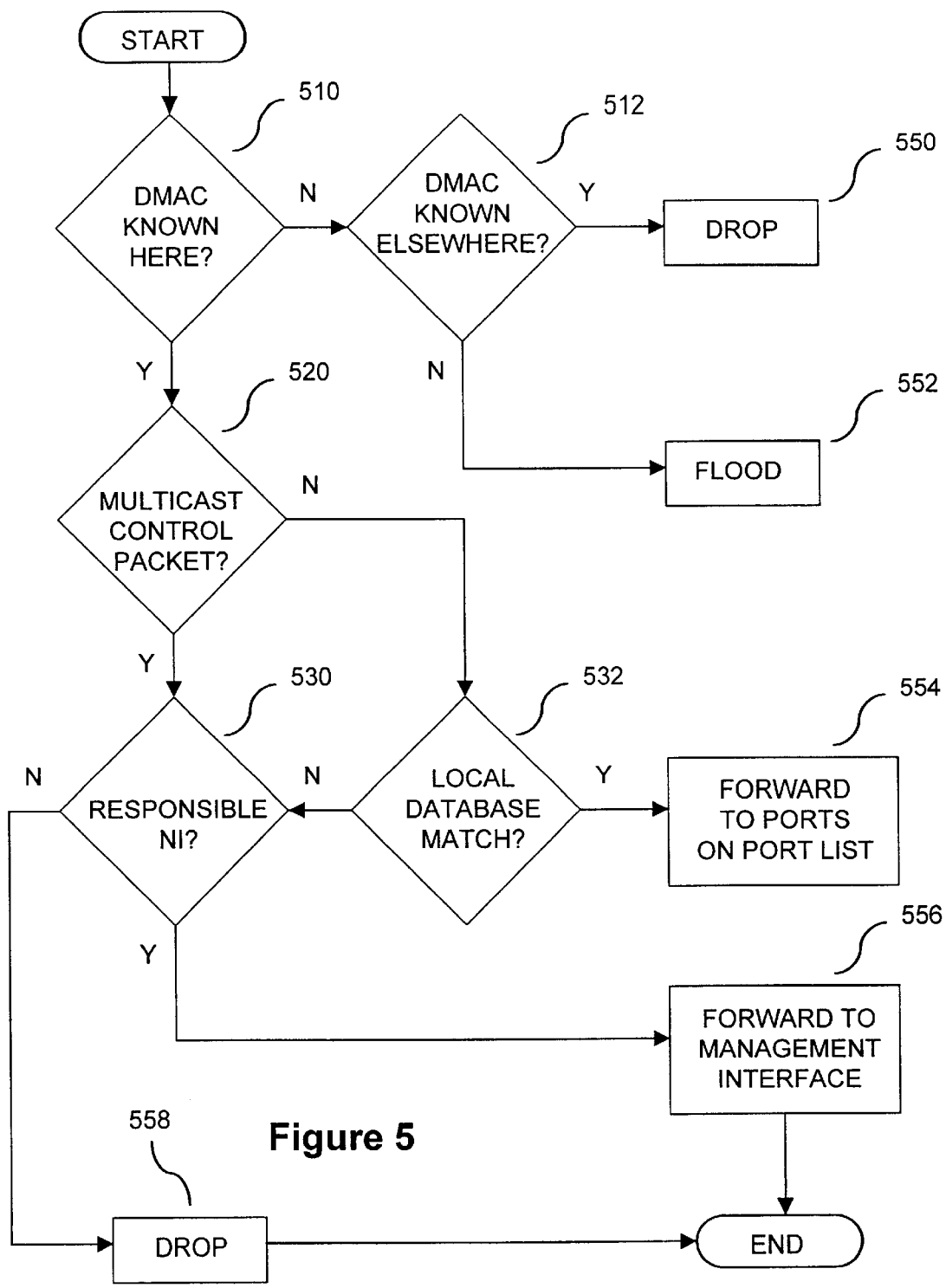
FIG. 5 is a flow diagram describing multicast packet processing undertaken at the network interfaces according to FIG. 1.
Figure 6:
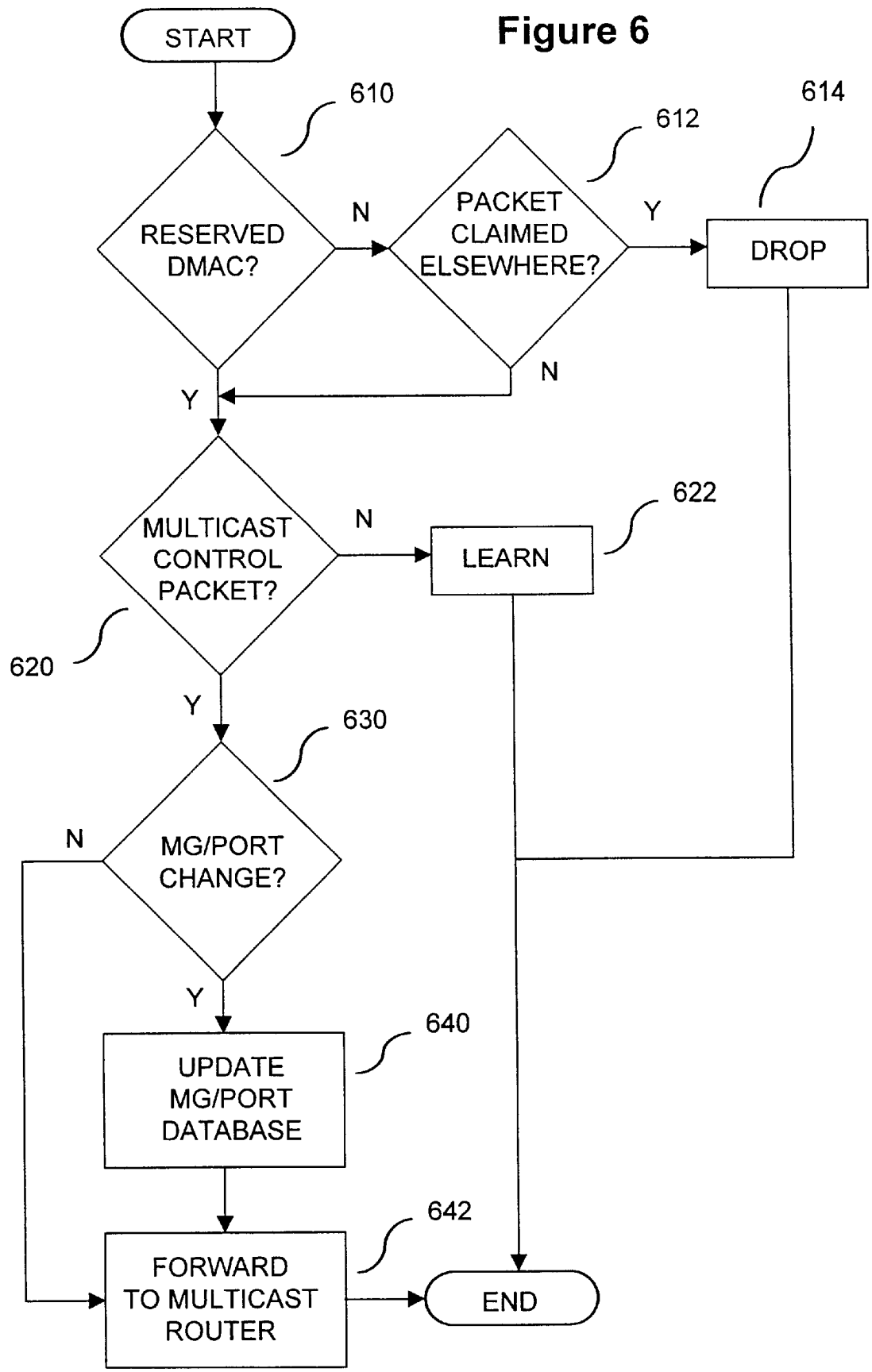
FIG. 6 is a flow diagram describing multicast packet processing undertaken at the management interface according to FIG. 1.

Interoperability of network interfaces 132 and management interface 134 in distributed multicast forwarding may be even more clearly understood by reference to FIGS. 5 and 6. FIG. 5 illustrates the processing algorithm run by representative network interfaces 432 on a multicast packet received from backplane 136. Upon arrival from backplane 136 at network interface 432, MAC database 412 is consulted to determine whether the packet has a destination MAC address known on interface 432 (510). If the packet does not have a destination MAC address known on interface 432, a check is made to determine whether another one of network interfaces 132 knows the destination MAC address or management interface 134 has claimed the packet (512). In this regard, network interfaces 132 individually "look up" the destination MAC address of packets transmitted on backplane 136 and share information about recognized addresses in a manner well known to the art, such as the assertion of "claim" line by any interface which recognizes the address. If the destination MAC address has been claimed by one of network interfaces 132 or management interface 134, the packet is dropped by interface 432 (550). If, however, the destination MAC address has not been claimed by any of network interfaces 132 or management interface 134, the packet is an unknown multicast packet and is flooded by interface 432 (and all other network interfaces 132) (552). Returning now to Step 510, if the packet has a destination MAC address known on interface 432, the packet is a known multicast data packet. Thus, a check is made to see if the packet is a membership control packet (520). If the packet is membership control packet, responsibility database 414 is consulted to determine if interface 432 is the responsible network interface for the multicast group identified in the packet (530). If interface 432 is the responsible network interface, interface 432 must forward the packet to multicast manager 310 for learning and recording of multicast group to virtual port associations in group/port database 312. Thus, in that event, the destination MAC address is replaced with a destination MAC address reserved for management interface 134 and the packet is retransmitted on backplane 136 (556). If interface 432 is not the responsible network interface, however, another one of network interfaces 132 is responsible for forwarding the packet to multicast manager 310 and the packet is dropped by interface 432 (558). Returning to Step 520, if the packet is not a membership control packet, the packet is a multicast data packet having a multicast group address for which there may be corresponding entries in local multicast database 416. Therefore, local multicast database 416 is consulted for a matching entry (532). A match is found if there is a "shadow" entry in local multicast database 412 having a source network address, multicast group address and ingress port corresponding to those identified in pertinent fields of the packet. If no matching entry is found, the packet is an unknown multicast data packet and a check is made to see if interface 432 is the responsible network interface for the multicast group (530). If interface 432 is the responsible network interface, interface 432. must forward the unknown multicast data packet to multicast manager 310 for learning and recording of a "master" entry in global multicast database 314. Thus, in that event, the destination MAC address is replaced with the destination MAC address reserved for the management interface 134 and the packet is retransmitted on backplane 136 (556). If the network interface is not the responsible network interface, the packet is dropped (538). Returning to Step 532, if a matching "shadow" entry is found in local multicast database 416, the packet is a known multicast data packet and is forwarded on the set of virtual ports specified in the virtual port list for the matching entry (554).

FIG. 6 illustrates the processing algorithm run by management interface 134 for processing multicast packets received from backplane 136. In accordance with FIG. 6, upon arrival from backplane 136 at management interface 134, the destination MAC address is reviewed to determine if the packet has a destination MAC address reserved for interface 134 (610). If the packet does not have a destination MAC address reserved for interface 134, a check is made to determine whether the packet has been claimed by one of the network interfaces 132 (612). If the packet has been claimed, it is dropped by the management interface 134 (614). If, however, the packet has not been claimed by one of the network interfaces 132, the packet is an unknown multicast packet and must be processed further by management interface 134. Returning to Step 610, if the packet has a destination MAC address reserved for interface 134, or if the packet is an unknown multicast packet, a check is made to determine if the packet is a multicast control packet (620). If the packet is not a multicast control packet, the packet is an unknown multicast data packet and is learned by recording a "master" entry in the global multicast database 314 (622). If, however, the packet is a multicast control packet, the packet is reviewed to determine whether an update must be made to the group/port database 312 (630). In this regard, the entry in group/port database 312 corresponding to the multicast group identified in the packet is "looked up" and determination is made whether the ingress port identified in the packet is among the ports in the virtual port list associated with the entry. Any necessary changes are made to the group/port database 312 (i.e., add port or delete port) (640) before forwarding the packet to multicast router 320 for further processing (642). For example, if the ingress port identified in a IGMP v.2 Host Membership Report is not already present in the entry, the ingress port is added to the virtual port list. If no change is required to group/port database 312, the packet is simply forwarded to multicast router 320 (642) without any update being made.

Figure 7:
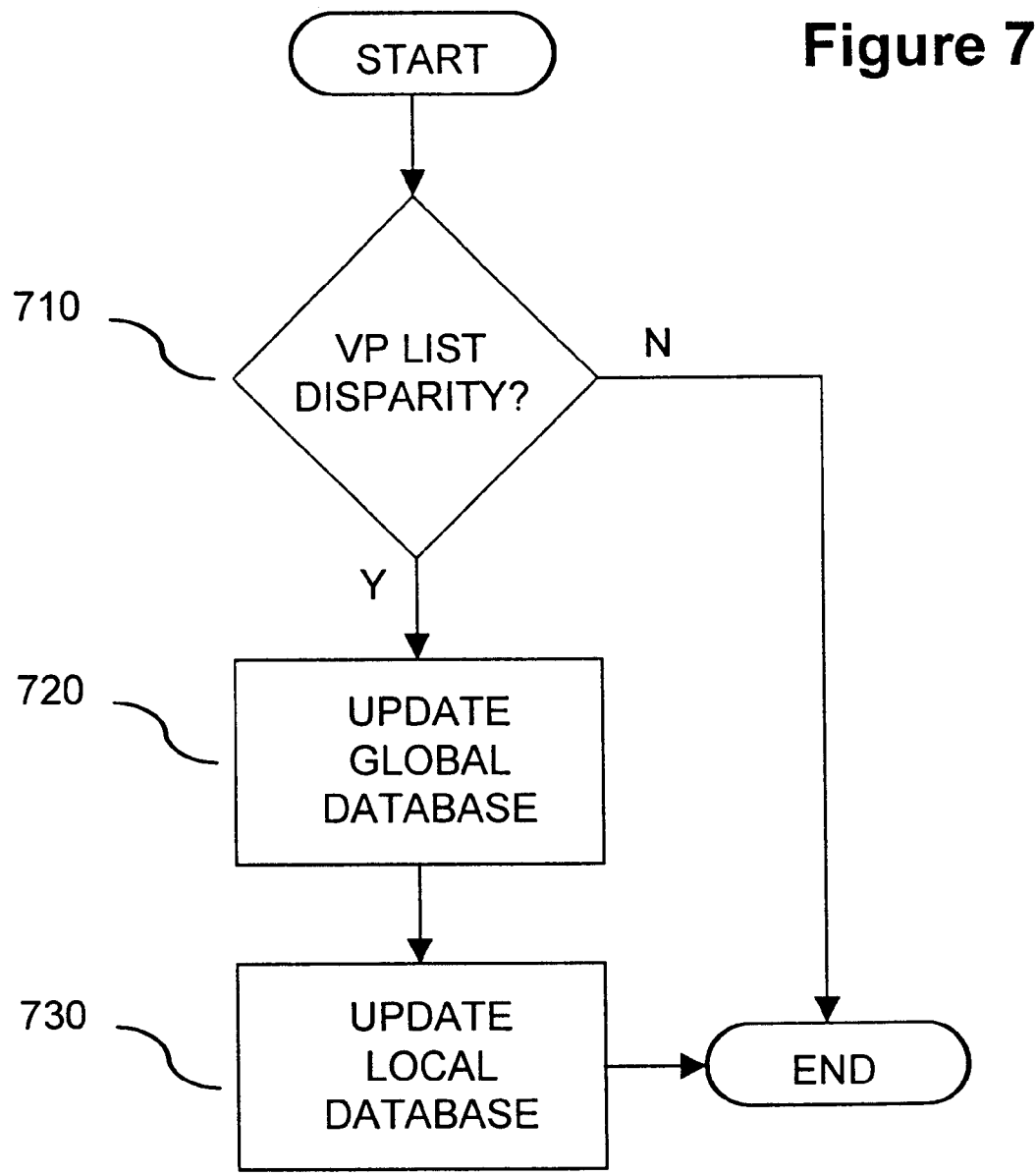
FIG. 7 is a flow diagram describing the global and local multicast database update process undertaken at the management and network interfaces according to FIG. 1.

FIG. 7 illustrates the processing algorithm run between management interface 134 and network interfaces 132 to update the virtual port lists in the global multicast database 314 and to update the local multicast databases. In accordance with the algorithm, multicast manager 310 compares the virtual port list in the group/port database 312 for a particular multicast group with the virtual port list in a "master" entry in global database 314 for the same multicast group to see if there is any disparity (710). If there is no disparity (i.e., there is a one-to-one correspondence between the virtual port lists), no further action is taken. If, however, there is a disparity, the "master" entry is updated by transferring virtual port information from the group/port database 312 to the global database 314 (720). In that event, multicast manager 310 transmits to a network interface associated with the virtual port for which the "master" entry was updated a "forwarding update" message reflecting the change made to the global multicast database 314, resulting in construction or update of a "shadow" entry in the network interface's local multicast database (730).

It will be appreciated by those of ordinary skill in the art that the invention can be embodied in other specific forms without departing from the spirit or essential character hereof. The present invention is therefore in all respects considered illustrative and not restrictive. The scope of the invention is defined by the appended claims, and all changes that come within the range of equivalents thereof are intended to be embraced therein.

We claim:

1. A method for forwarding a multicast data packet on a data communication bridge of the kind having a plurality of network interfaces sharing a backplane, each network interface having a plurality of ports, the method comprising;

transmitting the multicast data packet on the backplane, the multicast data packet identifying a multicast group;

determining at a network interface which ports, if any, on the network interface belong to the multicast group;

forwarding the multicast data packet from the network interface on the ports, if any, which belong to the multicast group; and invoking a management interface on the backplane for updating group membership information at the network interface.

2. A method for forwarding a multicast data packet on a data communication bridge of the kind having a plurality of network interfaces sharing a backplane, the method comprising:

transmitting the multicast data packet on the backplane;

reviewing information in the multicast data packet for a matching entry at a network interface, the information including a multicast group;

forwarding the multicast data packet from the network interface if a matching entry is found; and invoking a management interface on the backplane for updating group membership information at the network interface.

3. The method according to claim 2, wherein the network interface has a plurality of ports and the multicast data packet is forwarded only on ports identified in the matching entry.

4. The method according to claim 2, wherein the matching entry is retained in a database at the network interface.

5. The method according to claim 2, further comprising:
discarding the multicast data packet at the network interface if a matching entry is not found.

6. The method according to claim 2, wherein the information includes a source address.

7. The method according to claim 2, wherein the information includes an ingress port.

8. A method for configuring for distributed multicast forwarding a bridge of the kind having a plurality of network interfaces sharing a backplane, each network interface having a plurality of physical ports, the method comprising:

transmitting a multicast control packet on the backplane;

reviewing at a management interface on the backplane, identifiers in the multicast control packet, the identifiers including a multicast group and an ingress port; and adding the ingress port as member port for the multicast group at a network interface having a physical port corresponding to the ingress port.

9. A method for configuring for distributed multicast forwarding a bridge of the kind having a plurality of network interfaces sharing a backplane, each network interface having a plurality of physical ports, the method comprising:

transmitting a multicast control packet on the backplane;

reviewing at a management interface on the backplane, identifiers in the multicast control packet, the identifiers including a multicast group and an ingress port; and removing the ingress port as member port for the multicast group at a network interface having a physical port corresponding to the ingress port.

10. A method for configuring for distributed multicast forwarding a bridge of the kind having a plurality of network interfaces and a management interface sharing a backplane, each network interface having a plurality of physical ports, the method comprising:

assigning a network interface as the sole responsible interface for a multicast group;

receiving a multicast control packet for the multicast group on an ingress port;

transmitting the multicast control packet on the backplane;

retransmitting the multicast control packet on the backplane only from the responsible interface; and capturing the multicast control packet at the management interface and adding the ingress port as member port for the multicast group.

11. The method according to claim 10, further comprising:

transmitting a forwarding update to a network interface having a physical port corresponding to the ingress port, the forwarding update causing the network interface to add the ingress port as a member port for the multicast group.

12. The method according to claim 10, further comprising:

transmitting a forwarding update to a network interface having a physical port corresponding to the ingress port, the forwarding update causing the network interface to remove the ingress port as a member port for the multicast group.

* * * * *